March 5, 1935.  E. P. LARSH  1,993,449

ELECTRIC MOTOR

Filed June 8, 1932

Inventor
Everett P. Larsh
By Walker and Dehring
Attorneys

Patented Mar. 5, 1935

1,993,449

UNITED STATES PATENT OFFICE 1,993,449

ELECTRIC MOTOR

Everett P. Larsh, Vandalia, Ohio, assignor to The Master Electric Company, Dayton, Ohio, a corporation of Ohio Application June 8, 1932, Serial No. 616,049

34 Claims. (Cl. 172—278)

This invention relates to induction motors, and more in particular to induction motors of the shading ring type.

An object of this invention is to provide an induction motor that has a starting torque, that is efficient in its operation, that is cheap in construction, that is cheap to operate and that may be easily assembled.

Another object of this invention is to provide shading rings that are symmetrically disposed electrically, but unsymmetrically, mechanically. This has been done in order to facilitate the construction of the motor, and reduce the amount of labor required, and to reduce the cost of the motor without sacrificing performance.

Another object of this invention is to permit the removal of the energizing or field coil without dismantling the portion of the stator supporting the bearing brackets, without removing the rotor, and without removing the bearings supporting the rotor. This has been accomplished by providing a stator having laminations in two parts, one part carrying the rotor and the rotor bearings, and the other supporting the energizing coil.

Another object of this invention is to provide a shell type motor, having an offset shaft and provided with shading rings. This has been accomplished by providing a stator wherein the shading coils are substantially symmetrical electrically, and unsymmetrical mechanically.

Further objects and advantages of the present invention will be apparent from the following description, reference being had to the accompanying drawing wherein a preferred embodiment of one form of the present invention is clearly shown.

Figure 1:
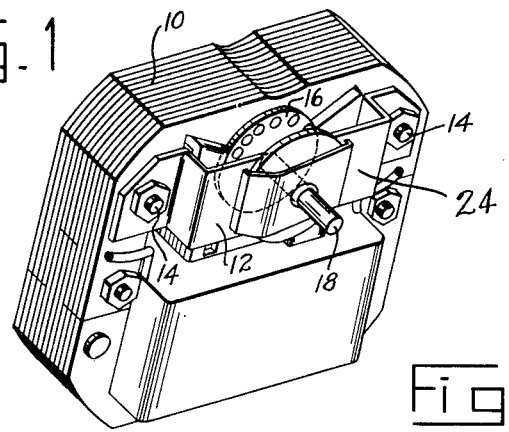
Figure 2:
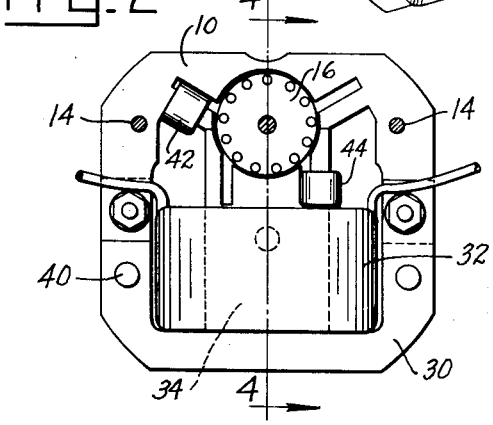
Figure 4:
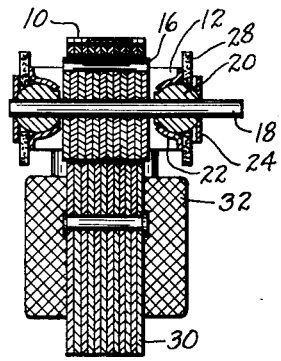
Figure 3:
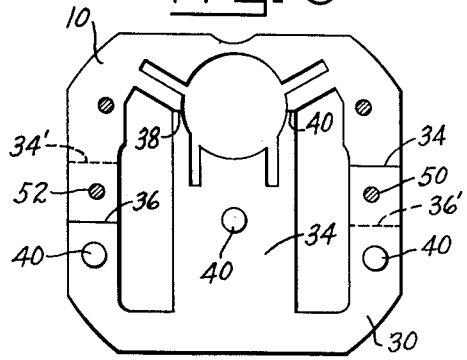
Figure 5:
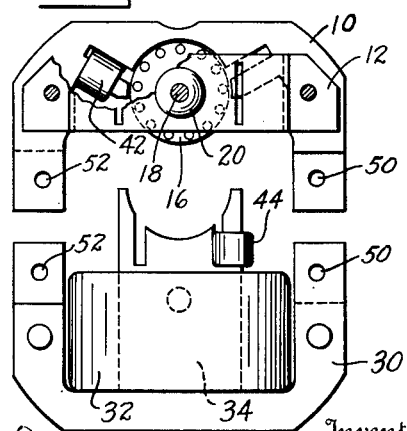
Figure 6:
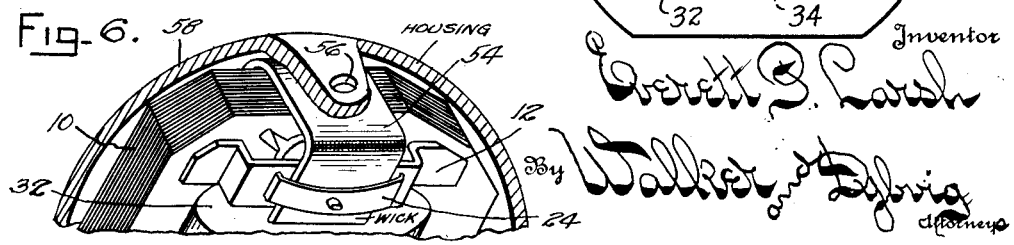

In the drawing, Fig. 1 is a perspective view of the induction motor. Fig. 2 is a side elevation of the motor. Fig. 3 is a plan view of the stator lamination. Fig. 4 is a sectional rear view taken substantially on the line 4—4 of Fig. 2. Fig. 5 is a view showing a portion of the stator carrying the bearings and the rotor intact with the remaining portion of the stator removed from the coil with its shading ring in position. Fig 6. discloses a fragmentary view of a modification, showing a portion of the motor casing broken away to show the stator.

In the drawing, the reference character 10 indicates the rotor carrying M-shaped portion of the stator that supports the bearing bracket 12 by rivets or screws 14, the brackets have journalled therein a rotor 16. The bearings for the rotor shaft 18 include a ball bearing 20 seated in a socket 22 in the bearing bracket 12 and held in position by a spring retaining member 24 suitably attached to the bearing bracket 12 and lubricated by a suitable washer 28. As may readily be seen this bearing is a self aligning bearing and forms the subject matter of my co-pending application, Serial No. 591,402, filed February 6, 1932. This being the case, no detailed description of the operation of the bearing is deemed necessary.

The stator also includes a substantially W-shaped portion 30 carrying a coil 32 on the center leg 34.

The laminations 10 and 30 are separated at 34, 36, 38, and 40. By reversing the laminations the gap between the laminations is interchanged so that a group of laminations are divided at 34 and 36, and in another group of laminations are separated at 34′ and 36′ as best seen in Fig. 3. The laminations 10, as already stated, are held together by the rivets or screws 14 and the laminations 30 are held in position by rivets or screws 40. After the laminations are attached a shading ring 42 links a portion of the pole piece formed by the center portion of the laminations 10, and a shading coil 44 links another portion of the lower laminations 30. It can readily be seen that electrically the shading rings 42 and 44 are substantially symmetrically arranged with respect to the rotor, but it is to be noted that the shading rings 42 and 44 are not symmetrically arranged mechanically, the shading ring 42 being almost radially disposed with respect to the rotor, and the shading ring 44 almost tangentially. This construction permits of easy assembly, very efficient operation, and a low cost of production.

The energizing coil 32 fits over the center portion 34 of the laminations 30 before the parts are assembled. Upon the mounting of the coil 32, shading rings 42 and 44, and the brackets 12 carrying the rotor 16 in place, the laminations 10 and 30 are brought together and secured in position by rivets fastened through the apertures 50 and 52 which hold the stator in position and the parts in a relatively fixed relation.

The size of the shading rings 42 and 44 is dependent entirely upon the operating characteristic of the motor. If it is desirable to have a very large starting torque, the area included by each of the shading rings should be fairly large and the size of the shading rings accordingly, but if it is desirable to have a comparatively small starting torque and high operating efficiency, it is desirable to enclose a comparatively small area by the shading rings of suitable characteristics. The size of the area enclosed by the shading ring and the size of the shading ring depend entirely upon the use to which the motor is to be applied, each of which may be determined by anyone skilled in the art. Therefore, when it is desirable to have a low starting torque and a high operating efficiency under normal operating conditions, it is desirable to reduce a portion of the pole piece enclosed by the shading ring and to reduce the size of the shading ring so as to reduce the losses.

The flux passing through the coil 32 divides into several components on each side of the coil. For the purpose of explanation one half of the cycle will be referred to as the positive cycle at which time it is assumed that the flux passes from the coil 32 through the center stem of the W-shape laminations 30 into the rotor, and the other half of the cycle as a negative half at which time the current flows from the coil 32 through the outer legs of the W-shape laminations 30. During the positive half of this cycle the flux passes from the coil 32 dividing into a plurality of components, one of which passes through the shaded portion of the center leg of the W-shape lamination 30 into the rotor, another of which may be designated the shaded component passing through the shading ring 44 and utilized in the rotor 16 and a third which may be designated the exciting flux passing through the shading ring 44 into the abutting portion of the M-shape lamination without linking the rotor 16.

During the negative half of the cycle the flux passes from the coil 32 dividing into two components, one for each outer leg of the W-shape lamination. These components may be united at least in part when reaching the center portion of the M-shape lamination, where a component which may be referred to as to the shaded portion enters the rotor.

A second component passes through the shading ring 42 and may be referred to as a shading flux that is utilized by the rotor. A third component which may be referred to as the exciting flux also passes through the shading ring 32 into the abutting portion of the center leg of the W-shape lamination without linking the rotor.

By having the pole tips of the one motor of one pole abut the pole tips of the other pole, better operating conditions are secured, for the reason that the butt joint forms a magnetic bridge causing a portion of the flux to pass through the shading coil directly to the other pole tip without passing through the rotor, thereby setting up sufficient exciting flux through the shading coil to generate sufficient current therein, thereby providing a sufficient amount of lagging or shaded flux which is later on passed through the rotor, as is well known to those skilled in the art.

From the foregoing description, it may be readily seen that in case it is necessary to repair the coil of the motor, any change of the coil or motor, or for any other reason have any work done thereon, or any other portion relating thereto, the lower portion 30 of the stator may be removed by removing the rivets 50 and 52 without disturbing the assembly of the upper portion 10 and the rotor 16 and the bracket for supporting the rotor so that the coil may be interchanged and again inserted without removing the working parts of the rotor.

In the modification disclosed in Fig. 6, the felt washers 28 have been replaced by a felt band or suitable wick 54 that extends from one bearing to the other. The intermediate portion of the band 54 spans the stator. By this arrangement the application of oil to the wick intermediate the bearings will supply oil to both the bearings. This facilitates the oiling of the motor as it is necessary to provide only one aperture 56 in the casing 58 for oiling both the bearings.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. In a single phase induction motor, a shell type stator, a rotor, and a pair of shading rings arranged symmetrically electrically with respect to the rotor, and unsymmetrically mechanically, the axis of one of said shading rings intersecting said rotor and the axis of the other being substantially tangential thereto.

2. In an induction motor, a stator, a rotor, an exciting coil linking said stator, and a plurality of shading rings substantially symmetrically arranged electrically with respect to the rotor and unsymmetrically arranged mechanically therewith, the axis of some of said shading rings being substantially tangential to the rotor, and others substantially radial thereto, the stator being so arranged as to have the rotor shaft offset with respect to the stator as a whole.

3. In an induction motor, a stator formed of laminations, said laminations being substantially M and W-shaped, the outer legs of said laminations overlapping, a rotor disposed in the center leg of said stator, bearing brackets carried by said M-shaped laminations, a coil carried by the center leg of the W-shaped laminations, said coil being removably mounted without disassembly of the M-shaped laminations, the rotor and the rotor brackets.

4. In an induction motor, a stator having a group of laminations substantially M-shaped, and a group of laminations substantially W-shaped abutting said M-shaped laminations, a rotor disposed in the path of the center leg of said laminations, a shading ring substantially radially disposed with respect to said rotor carried by one group of laminations, and a shading ring substantially tangentially arranged with respect to said rotor carried by the other group of laminations.

5. In an induction motor, a stator having a group of laminations substantially M-shaped, a rotor carried by said M-shaped laminations, said stator also including a group of substantially W-shaped laminations having the outer legs overlap the outer legs of the M-shaped laminations, an energizing coil linking said stator, a shading ring radially disposed with respect to the rotor linking a portion of one group of laminations, and a shading ring substantially tangentially arranged with respect to the rotor linking a portion of the other group of laminations.

6. In an induction motor, a stator having a group of laminations substantially M-shaped, a rotor carried by said M-shaped laminations, said stator also including a group of substantially W-shaped laminations having the outer legs overlap the outer legs of the M-shaped laminations, an energizing coil linking said stator, a shading ring radially disposed with respect to the rotor linking a portion of one group of laminations, and a shading ring substantially tangentially arranged with respect to the rotor linking a portion of the other group of laminations, the rotor shaft being offset so as to permit the energizing coil to be disposed on one leg of the stator.

7. In an induction motor, a stator having a group of laminations substantially M-shaped, a rotor carried by said M-shaped laminations, said stator also including a group of substantially W-shaped laminations having the outer legs overlap the outer legs of the M-shaped lamination, an energizing coil linking said stator, a shading ring radially disposed with respect to the rotor linking a portion of a group of laminations, and a shading ring substantially tangentially arranged with respect to the rotor linking a portion of the other group of laminations, and means for holding the M and W-shaped laminations in a relatively fixed relation.

8. In a shading ring induction motor of the character described, a laminated stator comprising a pair of spaced legs, transverse portions interconnecting the legs at their ends into an endless formation and an intermediate leg traversing the endless formation, and having an opening for a rotor at the juncture of said intermediate leg and one of the transverse portions, the intermediate leg and transverse portion contiguous to the opening having slots for reception of shading rings.

9. In an induction motor, a stator including substantially M- and W-shaped pole portions, a rotor positioned at the intersection of the pole portions, and shading rings carried by the center leg of the W-shaped pole portion and one arm of the M-shaped pole portions, and a winding on said stator.

10. In an induction motor, a stator comprising an endless frame-like formation, a transverse medial portion dividing the frame-like stator, a rotor positioned at the intersection of the transverse portion and one side of the endless frame-like formation, and shading rings carried by the transverse medial portion and by the intersected portion of the frame-like formation at one side of such intersection and contiguous to the rotor, and a winding upon the stator.

11. In an induction motor, a stator comprising an endless frame-like formation and a transverse medial portion dividing the frame-like stator, said stator being transversely separable into two sections, a rotor mounted in one of said sections and a winding mounted upon the other section.

12. An induction motor, including a stator separable into independent sections, a pole portion on each section, a rotor positioned therebetween, mounting means for the rotor carried entirely upon one of the sections independently of the other, and a winding carried upon the other section.

13. An induction motor, including a stator separable into independent sections, an energizing winding linking said stator, a pole portion on each section, a rotor positioned therebetween, mounting means for the rotor carried entirely by one of said sections independently of the other, said mounting means including a pair of bearings disposed on each side of the stator, and a wick spanning one section making contact with the bearings for oiling the bearings.

14. An electric motor, including a stator, a rotor and an energizing winding, a pair of bearings supporting the shaft of said rotor, said bearings being arranged on opposite sides of the stator, and a felt band spanning the stator and contacting each of said bearings, said band supplying oil to each of the bearings.

15. An electric motor, including a stator, a rotor and an energizing winding, a pair of bearings supporting the shaft of said rotor, said bearings being arranged on opposite sides of the stator and means spanning the stator and contacting each of said bearings, said means supplying oil to the bearings.

16. In an electric motor, a stator separable into independent sections, an energizing winding linking one section of said stator, a rotor positioned intermediate said sections, bearings in which the rotor is journalled, said bearings being arranged on opposite sides of and carried by one of said sections independently of the other and means spanning the section carrying said bearings for supplying oil thereto.

17. In an induction motor, a stator separable into independent sections, an energizing winding for said stator, a pole portion on each of said sections, a rotor positioned therebetween, mounting means for the rotor carried entirely by one of said sections independently of the other, said mounting means including a pair of bearings disposed on each side of the stator and means spanning one of said sections and associated with said bearings for supplying oil thereto.

18. An electric motor including a stator, a rotor and an energizing winding, a pair of bearings supporting the shaft of said rotor, and means spanning the stator and contacting each of said bearings, said means including a wick for supplying oil thereto.

19. In an electric motor, a stator, an energizing winding linking a portion of said stator and rotor bearings carried by said stator in which the rotor is journaled and means including a wick spanning the stator for supplying oil to the bearings.

20. In an electric motor a stator including a transverse portion and a medial portion extending substantially perpendicular to the transverse portion, at a mid-length region thereof, said portions being separable one from the other, at their point of intersection, and detachably interconnected in spaced relation therewith, a rotor located at the intersection of said portions and carried wholly by one of the portions, a winding carried by the other portion, and a shading ring carried by each of said portions.

21. In an electric motor, a stator including a transverse portion and a medial portion extending perpendicularly to the transverse portion, said portions being separable one from the other at their point of intersection, a rotor located at the intersection of said portions and supported wholly by one of the portions, a winding carried by the other portion, and shading rings arranged with their axes angularly disposed to each other carried by the respective portions.

22. In an electric motor a stator including a transverse portion and a separable medial portion extending in perpendicularly intersecting relation to the transverse portion at a mid-length region thereof, the opposite ends of said transverse portion being detachably interconnected with the intermediate portion in spaced relation with said intersection, a rotor located at the intersection of the medial and transverse portions, characterized by rotor bearing on one of the por- 23. In an electric motor a stator including a transverse portion and a separable medial portion extending in perpendicularly intersecting relation to the transverse portion at a mid-length region thereof, the opposite ends of said transverse portion being detachably interconnected with the intermediate portion in spaced relation with said intersection, a rotor located at the intersection of the medial and transverse portions, and a winding slidable over said intersecting end of the medial portion.

24. In an electric motor a stator including a transverse portion and a separable medial portion extending in perpendicularly intersecting relation to the transverse portion at a mid-length region thereof, the opposite ends of said transverse portion being detachably interconnected with the intermediate portion in spaced relation with said intersection, a rotor located at the intersection of the medial and transverse portions, the medial portion having a longitudinal slot therein and the transverse portion having a transversely disposed slot therein, and shading rings mounted in the respective slots.

25. In an electric motor a stator including a transverse portion and a separable medial portion extending in perpendicularly intersecting relation to the transverse portion at a mid-length region thereof, the opposite ends of said transverse portion being detachably interconnected with the intermediate portion in spaced relation with said intersection, a rotor located at the intersection of the medial and transverse portions, slots in the respective portions arranged in angularly disposed relation with each other, and shading rings mounted in slots of the respective portions.

26. In an electric motor, a stator separable into independent sections including transversely disposed meeting portions each formed with a registering concentric segmental indentation therein to conjointly form an opening to receive a rotor, a rotor therein, relatively inclined slots in one of the portions intersecting the indentation thereof and the other portion having relatively parallel slots likewise intersecting the indentation thereof, and shading rings positioned in certain of said slots.

27. An electric motor including a stator separable into independent sections, an arm included in one of the sections having at its terminal a segmental indentation, and a portion of the other section disposed transversely of said arm and extending in opposite direction therebeyond in substantially perpendicular relation thereto and having in a medial portion thereof a segmental indentation registering with that of the arm, to form an opening to receive a rotor, a rotor in said opening, said arm having therein a slot intersecting said segmental indentation thereof and the transverse portion likewise having a slot therein intersecting the segmental indentation thereof, said slots being disposed in inclined relation to each other, and shading rings extending within said slots.

28. A pair of complementary symmetrical stator plates for an electric motor, one of said plates including an arm having at its end a segmental indentation and two parallel slots intersecting the indentation, the slots and indentation being symmetrically disposed relative to the plate, the other plate including a portion extending transversely of the arm of the first plate and having in a lateral margin thereof a symmetrically disposed segmental indentation registering with that of the arm of the other plate and having inclined symmetrically arranged slots intersecting the said indentation, and overlapping extensions on the respective plates at opposite sides of and in spaced relation with said arm.

29. A stator for an electric motor separable into independent sections, an arm on one of the sections having in its terminal end a segmental indentation, and a slot intersecting the indentation, the other section including a portion arranged transversely of the arm and extending in opposite directions therebeyond, and having therein a segmental indentation registering with that of the arm to form an opening for a rotor and having angularly disposed slots intersecting said indentation, and overlapping extensions on the respective sections at opposite sides of said arm and in spaced relation therewith.

30. An induction motor, including a stator separable into independent sections, an energizing winding linking said stator, a pole portion on each section, a rotor positioned therebetween, mounting means for the rotor carried entirely by one of said sections independently of the other, said mounting means including a pair of bearings disposed on each side of the stator.

31. In an electric motor of the character described, a stator including an exterior closed circuitous portion and a portion extending transversely thereof, a portion of the exterior portion being separable from the other and from the transverse portion, a winding upon the transverse portion, a rotor mounted at the intersection of one end of the transverse portion with the exterior portion, and shading rings carried by the transverse and exterior portions.

32. Complementary stator plates for an electric motor conjointly forming a closed circuitous portion and a transverse portion bisecting the circuitous portion, said plates being separable to expose an end of the transverse portion to slidingly receive a winding, there being a circular opening at the juncture of the circuitous and transverse portions to receive a rotor and spaced slots intersecting the rotor opening to receive shading rings.

33. In an electric motor, a stator including an annular portion and a transverse portion bisecting the annular portion, said stator being separable to slidingly receive a winding upon the transverse portion, a winding thereon, a rotor at the intersection of the annular and transverse portions of the stator, and a shading ring carried by each of said portions.

34. In an electric motor, a stator including an annular portion and a medial portion extending transversely within the annular portion said stator being adjustable to expose an end of the transverse medial portion to slidingly receive a winding thereon a winding located on said transverse portion, the stator having an opening to receive a rotor substantially at the intersection of the annular and transverse portions thereof, a rotor in said opening, the respective portions of the stator having relatively spaced slots intersecting the rotor opening and shading rings positioned in said slots.

EVERETT P. LARSH.